United States Patent Office 3,509,255
Patented Apr. 28, 1970

3,509,255
PROCESS FOR THE RECRYSTALLIZATION OF NYSTATIN
Harold Mendelsohn, Nanuet, N.Y., assignor to American Cyanamid Company, Stamford, Conn., a corporation of Maine
No Drawing. Filed July 2, 1968, Ser. No. 741,912
Int. Cl. A61k 21/00
U.S. Cl. 424—123                                                   10 Claims

ABSTRACT OF THE DISCLOSURE

This disclosure describes a process for preparing highly purified crystalline nystatin by extracting crude nystatin with acetone which is saturated with sodium iodide, sodium thiocyanate, potassium thiocyanate or ammonium thiocyanate; and precipitating highly purified crystalline nystatin from the extract by displacement of the acetone with water.

BRIEF SUMMARY OF THE INVENTION

The present invention relates to the antifungal antibiotic nystatin (originally termed fungicidin) and more particularly, is concerned with an improved process of preparing highly purified crystalline nystatin. The present invention is based upon the discovery that crude or partially purified nystatin may be readily converted to highly purified crystalline nystatin by a process involving (1) slurrying crude nystatin in a solution of acetone which is saturated with sodium iodide, sodium thiocyanate, potassium thiocyanate or ammonium thiocyanate or mixtures thereof, at a temperature of from about 10° C. to about 45° C.; (2) removing undissolved material from the resulting slurry; (3) removing part of the acetone solvent from the resulting solution by evaporation; (4) adding water to the resulting concentrated solution in an amount of at least about one tenth of the volume of salt saturated acetone solution; and (5) recovering the resulting precipitate of highly purified crystalline nystatin.

DETAILED DESCRIPTION OF THE INVENTION

The antibiotic nystatin (fungicidin) and its method of preparation from *Streptomyces noursei* are described in U.S. Patent No. 2,797,183 to Hazen et al. See also Hazen et al., "Fungicidin, an Antibiotic Produced by a Soil Actinomycete," Proc. Soc. Exptl. Biol. Med. 76, 93 (1950) and Brown et al., "Effect of Fungicidin (nystatin) in Mice Injected with Lethal Mixtures of Aureomycin and *Candida albicans*," Science 117, 609 (1953). The antibiotic is referred to hereinafter by the single term "nystatin."

Crude concentrates of nystatin can be prepared by extracting the myceliel mat with several portions of methanol and then processing the methanolic solution by fractional precipitation with ethyl acetate, washing the precipitate with 0.85% sodium chloride solution, redissolving in methanol and fractional precipitation with diethyl ether. See Hazen et al., U.S. Patent No. 2,797,183, supra. Low yields of active crystalline material can be obtianed from the resulting crude concentrates by distribution between n-butanol and saline and by partial precipitation from methanol. Crystalline nystatin of high purity has been obtained by distribution of partially purified nystatin con- and Brown et al., "Effect of Fungicidin (nystatin) in butanol, methanol, water and hexane and allowing this system to stand exposed to air evaporation until a crop of crystals collects at the interface. Dutcher et al., Antibiotics Annual, 1953–1954, pages 191–194, Medical Encyclopedia, Inc., New York, N.Y.

The recovery of nystatin by isopropanol extraction of the whole broth resulting from the fermentation of the nystatin producing *Streptomyces noursei* is described in U.S. Patent No. 2,786,781 to Vandeputte et al. The partially purified product obtained by the Vandeputte et al. process is a therapeutically useful product of about 65–70% purity. At best, however it is only partially crystalline and for the most part is substantially non-crystalline or amorphous in character. The purification of nystatin employing methanolic-calcium chloride is also described in U.S. Patent No. 2,832,719 to Vandeputte and in U.S. Patent No. 2,865,807 to Dutcher et al. The product obtained by the Vandeputte and Dutcher et al. processes is a therapeutically useful highly refined product substantially crystalline in character.

The processes described above produce crystalline nystatin but are objectionable due to the presence of impurities or low yields. They are also objectionable as they are relatively difficult to control and are not of the type desired in large-scale commercial operations.

It is known that pure crystalline nystatin is indicated for certain uses in the antifungal field and attempts have been made to develop improved, simplified processes of obtaining the pure crystalline material in high yield. Attempts in particular have been made to prepare pure crystalline nystatin directly from the relatively crude partially purified plant material obtained by isopropanol extraction of the whole broth by the use of this material in the methanolic-calcium chloride process. In the past, with the processes available, this approach has not been found to be entirely satisfactory or completely successful as the product obtained was seldom uniform and was also frequently contaminated by amorphous material. With continued investigation, I have discovered that crude partially purified nystatin may be readily converted to highly purified crystalline nystatin by a process comprising two basic steps; (A) extracting crude nystatin with acetone which is saturated with sodium iodide, sodium thiocyanate, potassium thiocyanate or ammonium thiocyanate or any mixture thereof, and (B) precipitating highly purified crystalline nystatin from the extract by dilution or displacement of the acetone with water.

Various crude or semi-purified nystatin containing preparations may be employed as starting materials in the novel process of the present invention. The mycelial mat or crude concentrates prepared therefrom by any of various extraction and fractional precipitation procedures may be used. Partially purified nystatin prepared by any of the various procedures known to the art, such as the isopropanol extraction of the whole broth, may also be used. In short, any nystatin containing material may be employed as a starting material in the purification process of the present invention provided only that it be substantially free from water.

The extraction step is readily carried out by merely slurrying the nystatin containing starting material in a solution of acetone saturated with sodium iodide, sodium thiocyanate, potassium thiocyanate, ammonium thiocyanate or mixtures thereof. The slurry is stirred for a period of time of from a few minutes to about an hour at a temperature of from about 10° C. to about 45° C. Neither the amount of salt saturated acetone solution employed nor the stirring time is critical since a nystatin-salt complex is rapidly formed with is *extremely* soluble in acetone. To illustrate, the solubility of nystatin in acetone at room temperature (25°–27° C.) is approximately 49 units/milliliter. In contrast, the solubility of nystatin in salt saturated acetone solutions at 25°–27° C. is set forth in Table I below:

TABLE I

| Salt saturated acetone solution | Solubility of nystatin therein, units/ml. |
|---|---|
| NaI/acetone | 786,000 |
| NaSCN/acetone | 278,000 |
| KSCN/acetone | 1,000,000 |
| NH₄SCN/acetone | 900,000 |

However, illustrative amounts of salt saturated acetone solution which may be conveniently used with various types of nystatin containing starting materials are set forth in the specific examples appended hereinafter.

The salt saturated acetone solution may be readily prepared by stirring acetone with an excess of one of the four salts enumerated hereinabove or with an excess of a mixture of two or more of these salts at room temperatures. After the acetone is salt saturated, it is filtered from the excess insoluble salt. Salt mixtures which are particularly useful in the present process are NaI+NH₄SCN, NaI+NaSCN, and NaSCN+KSCN. The extraction step is conveniently carried out at a temperature of from about 10° C. to about 45° C., preferably at room temperature (25°–30° C.). After the extraction of the nystatin containing starting material is complete, any undissolved material is removed from the salt saturated acetone extract by any convenient means such as filtration or centrifugation. The nystatin containing acetone extract may be further clarified, if desired, by treatment with charcoal, diatomaceous earth, and the like followed by filtration or centrifugation.

Highly purified crystalline nystatin is then precipitated from the clarified acetone extract either by direct dilution with water or by partial displacement of the acetone with water. When direct dilution is employed, water is added to the acetone extract in an amount of at least about one tenth of the volume of salt saturated acetone extract. When partial displacement is employed, part of the acetone solvent is first removed from the acetone extract by evaporation either in vacuo or at atmospheric pressure, preferably with the application of heat in order to shorten the evaporation time. The acetone extract is thus concentrated to at least half of its original volume, preferably to about one quarter of its original volume. Water is then added to the concentrated acetone extract in an amount of at least about one tenth of the volume of concentrated acetone extract. In either case, the greater the volume of water employed, the greater is the recovery of highly purified crystalline nystatin from the acetone extract. The precipitated crystalline nystatin is then collected by filtration or centrifugation, washed with a solvent such as water, acetone, methanol, etc., and dried. So long as water is added to the acetone extract to the extent of at least 10% of the volume of the acetone extract, then other organic solvents may be present in the water for convenience (enhanced crystal size, density or visual appearance). It is only necessary that nystatin be insoluble in these organic solvents and typical such organic solvents are, for example, methyl isobutyl ketone, n-butanol, ethanol, ethyl acetate, dimethylformamide and dioxane.

The invention will be described in greater detail in conjunction with the following specific examples.

Example 1.—Recrystallization of nystatin from crude nystatin using sodium thiocyanate saturated acetone A saturated solution of sodium thiocyanate in pure acetone was prepared by dissolving about 9 grams of sodium thiocyanate per 450 milliliters of acetone at 27° C. A 20 gram portion of crude nystatin, having a potency of 2202 units/milligram by microbiological assay, was added to 450 milliliters of the sodium thiocyanate saturated acetone. The nystatin was essentially dissolved by stirring for 20 minutes at 40° C. A portion of diatomaceous earth was added and the impurities were removed by filtration. The filter cake was washed with 25 milliliters of fresh sodium thiocyanate saturated acetone. The combined filtrates were concentrated under vacuum at 25°–35° C. and 40 milliliters of water was added. After concentration to about one-half volume 75 milliliters of 4:1 (v./v.) water-acetone solution was added and the concentration to one-half volume was repeated. The nystatin precipitated during this displacement of acetone with water. To the concentrate was added 35 milliliters of the 4:1 water-acetone solution. The process was completed by aging for 1½ hours at 40° C. followed by 2 hours at room temperature (27° C.). The crystallized nystatin was filtered, washed with the water-acetone solution and dried in vacuo. The yield was 10.01 grams of crystalline nystatin assaying 4113 units/milligram (microbiological assay).

Example 2.—Recrystallization of nystatin from crude nystatin using sodium iodide saturated acetone A saturated solution of sodium iodide in acetone at 25°–27° C. was prepared. A 50 gram portion of crude nystatin, having a potency of 2650 units/milligram by microbiological assay, was added to 200 milliliters of the sodium iodide saturated acetone. The nystatin was essentially dissolved by stirring for 1 hour. The solution was clarified by centrifuging and decanting the supernatant. The orange colored supernatant had a volume of 250 milliliters. To 40 milliliters of this supernatant (assaying 658,400 units/milliliter) was quickly added, with stirring, 128 milliliters of n-butanol followed by 32 milliliters of water. The solution was warmed to 35°–42° C. by an external water bath. About 20 milligrams of pure nystatin was added as seed. In about 15 minutes the formation of crystals started. After about one hour the water bath was removed and the aging was continued for 2½ hours at room temperature. The product was filtered, washed with small amounts of fresh solvent having the same composition as the mother liquor and dried in vacuo. The yield was 5.09 grams of crystalline nystatin assaying 4370 units/milligram (microbiological assay).

Example 3.—Recrystallization of nystatin from fermentation mash using sodium thiocyanate saturated acetone The pH of a 250 milliliter portion of fermentation mash, prepared by fermenting strains of Streptomyces noursei was adjusted to 6.6 with 5.0 milliliters of hexadecyl trimethyl ammonium chloride. A 250 milliliter portion of acetone and 12.5 grams of diatomaceous earth were added. The mixture was stirred for about 30 minutes and then filtered by suction on a precoated filter funnel. The cake was washed with additional amounts of pure acetone. The cake was air dried and then the nystatin was extracted with 60 milliliters of a saturated solution of sodium thiocyanate in acetone by stirring and filtering. This extraction was repeated three more times with a 100 milliliter portion, then a 120 milliliter portion and in the final extraction a 40 milliliter portion of sodium thiocyanate saturated acetone by stirring and filtering each time. A combined total of 284 milliliters of sodium thiocyanate-acetone solution of nystatin was obtained. This solution was concentrated in vacuo and the nystatin was crystallized by gradual removal of the acetone and addition of water as described in Example 1. The nystatin thus obtained assayed 4471 units/milligram, representing a 72% yield by microbiological assay.

Example 4.—Recrystallization of nystatin from fermentation mash using sodium iodide saturated acetone A 250 milliliter portion of fermentation mash, prepared by fermenting strains of Streptomyces noursei and comprising solids, nystatin, n-butanol and water, which as a whole, assayed 92,070 units/milliliter, was mixed with 250 milliliters of acetone. A 5 milliliter portion of hexadecyl trimethyl ammonium chloride was added. The apparent pH (1:1 aqueous mixture) was 7.0. The mixture was stirred for 20 minutes, a 12.5 gram portion of diatomaceous earth was added and after further stirring the mixture was filtered. The cake was washed with a final acetone rinse and air dried at room temperature. Nystatin was then recovered from the damp cake by repeated extraction with portions of sodium iodide saturated acetone solution at room temperature. The combined sodium iodide saturated acetone filtrates had a volume of 173 milliliters which assayed 122,000 units of nystatin per milliliter. The nystatin was recovered from this filtrate by displacement of the acetone with water as described in Example 1. The product obtained assayed 3935 units of nystatin per milligram representing a yield of 69% by microbiological assay.

I claim:

1. In the process of preparing highly purified crystalline nystatin, the steps which comprise dissolving crude nystatin in a solution of acetone saturated with a salt selected from the group consisting of sodium iodide, sodium thiocyanate, potassium thiocyanate, ammonium thiocyanate and mixtures thereof, at a temperature of from about 10° C. to about 45° C., precipitating highly purified crystalline nystatin from the solution by adding water thereto in the amount of at least about one tenth of the volume of the solution, and recovering the precipitate of highly purified crystalline nystatin.

2. A process according to claim 1 wherein the salt is sodium iodide.

3. A process according to claim 1 wherein the salt is sodium thiocyanate.

4. In the process of preparing highly purified crystalline nystatin, the steps which comprise slurrying partially purified nystatin in a solution of acetone saturated with a salt selected from the group consisting of sodium iodide, sodium thiocyanate, potassium thiocyanate, ammonium thiocyanate, and mixtures thereof, at a temperature of from about 10° C. to about 45° C., removing undissolved material from the slurry, adding water to the resulting solution in the amount of at least about one tenth of the volume of salt saturated acetone solution, and recovering the resulting precipitate of highly purified crystalline nystatin.

5. A process according to claim 4 wherein the salt is sodium iodide.

6. A process according to claim 4 wherein the salt is sodium thiocyanate.

7. In the process of preparing highly purified crystalline nystatin, the steps which comprise slurrying impure nystatin in a solution of acetone saturated with a salt selected from the group consisting of sodium iodide, sodium thiocyanate, potassium thiocyanate, ammonium thiocyanate, and mixtures thereof, at a temperature of from about 10° C. to about 45° C., removing undissolved material from the slurry, removing part of the acetone solvent from the resulting solution by evaporation, adding water to the resulting concentrated solution in the amount of at least about one tenth of the volume of concentrated acetone solution, and recovering the resulting precipitate of highly purified crystalline nystatin.

8. A process according to claim 7 wherein the salt is sodium iodide.

9. A process according to claim 7 wherein the salt is sodium thiocyanate.

10. A process according to claim 7 wherein the salt is a mixture of sodium iodide and sodium thiocyanate.

References Cited

UNITED STATES PATENTS

| 2,786,781 | 3/1957 | Vandeputte et al. | 424—120 |
| 2,797,183 | 6/1957 | Hazen et al. | 424—120 |
| 3,332,844 | 7/1967 | Vandeputte et al. | 424—120 |

ALBERT T. MEYERS, Primary Examiner

D. M. STEPHENS, Assistant Examiner

U.S. Cl. X.R.

424—120